O. M. BOSART.
PISTON RING.
APPLICATION FILED MAR. 13, 1916.

1,251,743.

Patented Jan. 1, 1918.

WITNESSES:
Frank A. Fahle
Josephine Gasper

INVENTOR
Oscar M. Bosart,
BY
Hood & Schley
ATTORNEYS

UNITED STATES PATENT OFFICE.

OSCAR M. BOSART, OF INDIANAPOLIS, INDIANA.

PISTON-RING.

1,251,743.

Specification of Letters Patent.

Patented Jan. 1, 1918.

Application filed March 13, 1916. Serial No. 83,713.

*To all whom it may concern:*

Be it known that I, OSCAR M. BOSART, a citizen of the United States, residing at Indianapolis, in the county of Marion and State of Indiana, have invented a new and useful Piston-Ring, of which the following is a specification.

It is the object of my invention to provide a piston ring construction which will always remain tightly seated against the side walls of the groove in the piston and will be forced outward against the cylinder wall, so that it effectually prevents leakage around it.

In carrying out my invention, I provide outer and inner expansible rings, which tend to expand against the cylinder walls by their own inherent resiliency, and which engage each other on frusto-conical surfaces, the rings being of such size and shape that the inner one is always out of engagement with the cylinder wall so that it is always free to exert its expansive force on the other ring and force it both axially against the side of the piston ring groove and radially against the cylinder wall. Preferably, there is also a third ring against which the inner ring bears axially, this third ring serving to prevent interference with the action of the parts as by the "climbing" of the outer ring on the edge of the piston groove by reason of any possible roughness of machining of the groove in the piston ring. The third ring also serves to make the device applicable to piston grooves of different width without requiring any change in the first two rings, it being necessary merely to use a third ring of different width. The rings individually may be either concentric or eccentric.

The accompanying drawing illustrates my invention.

Figure 1:
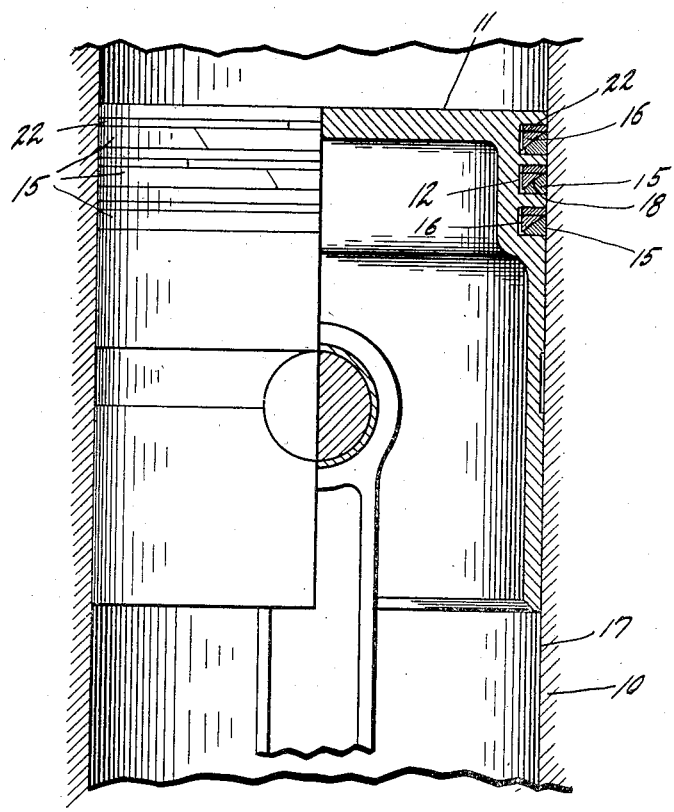
Figure 2:
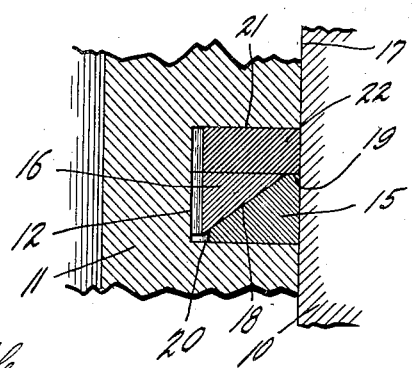

Figure 1 is a fragmentary elevation in partial section through a piston and cylinder fitted with piston rings embodying my invention; and Fig. 2 is an enlarged view showing a fragment of the piston and cylinder and a radial section through the piston ring.

The cylinder 10 and piston 11 are of any usual construction. The piston may be provided with any number of circumferential grooves 12, in the usual manner.

My improved piston ring fundamentally comprises an outer split ring 15 and an inner split ring 16, which are of such size that they tend to spring outward by their own resiliency against the wall 17 of the cylinder 10, and are individually either concentric or eccentric. The outer ring 15 bears against the cylinder wall 17, and the two rings 15 and 16 engage each other along frusto-conical surfaces 18. The rings 15 and 16 are confined axially in a space sufficiently narrow so that the inner ring 16 can never spring outward against the cylinder wall 17, and to this end the outer ring 15 is provided at the large end of the frusto-conical surface 18 with a flat surface 19, so that the frusto-conical surface on the outer ring 15 does not intersect the cylindrical outer surface of the outer ring 15.

In action, the inner split spring 16 tends to expand by its inherent resiliency, acting on the outer split ring 15 along the interengaging frusto-conical surfaces 18. This expansive force of the inner ring 16 supplements the expansive force of the outer ring 15 in forcing the outer surface of the ring 15 against the cylinder wall 17; but it also causes a cam action on the frusto-conical surfaces 18 to force the outer ring 15 axially against one side wall 20 of the groove 12 and the inner ring 16 toward the other side wall 21 of such groove. In order to render these axial forces operative, the angle of the frusto-conical surfaces with the axis of the rings is greater than the angles of repose of the materials forming the rings. These forces are always in action, because the outer edge of the inner ring 16 is always out of engagement with the cylinder wall 17 so that its outward action is always wholly against the outer ring 15. In consequence, the rings 15 and 16 are always forced in opposite axial directions to the limits allowed by the walls of the piston groove, and there can be no material leakage around them. This is so when the piston is at rest, when it is moving in either direction, and when it is changing direction at the end of its stroke. Moreover, the outer ring 15 is of substantially the full width of the groove allowed for the two rings 15 and 16, so that the inner ring 16 is substantially wholly within the outer ring 15 and there is no appreciable gap between the outer ring and either side wall of the groove containing the rings 15 and 16.

Preferably, in addition to the rings 15 and 16, I provide a third split ring 22, which bears directly against the cylinder wall 17 beside the outer ring 15 and against which the inner ring 16 bears. By using rings 22 of different width the same rings 15 and 16 may be used for grooves 12 of different widths. Mainly, however, the ring 22 is provided so that in case of any inaccuracy of machining of the groove 12, the inner ring 16 is not interfered with in its expansive action, for it is a "floating" ring which does not touch the cylinder or piston but acts as an expanding wedge between the easily finished lower wall of the third split ring 22 and the likewise easily finished frusto-conical surface 18 of the outer ring 15 and forces such rings 15 and 22 apart; and so that by reason of the expansion of the third ring 22 against the cylinder wall the inner or frusto-conical surface of the outer ring 15 is prevented from "climbing" the corner of the groove in the piston wall as it would be apt to do upon the wearing of the parts if the third ring 22 were not provided. Thus I prefer to place the third ring 21 on that side of the rings 15 and 16 so that it is acted on by the inner ring 16, though for some purposes it can be placed on the other side of such rings 15 and 16.

I claim as my invention:

1. A piston ring construction, comprising a split outer ring for engaging the cylinder wall, and a split inner ring tending to expand, said outer and inner rings engaging on frusto-conical surfaces the angle of which to the axis of the rings is greater than the angle of repose of the material of the rings, being free of any interconnection which prevents them from moving axially on each other on such frusto-conical surfaces, and having respectively toward the smaller and larger ends of said frusto-conical surfaces plane end surfaces perpendicular to the axis of the rings, and a third split ring against which the plane end surface of said inner ring at the large end of said frusto-conical surface bears, said third ring engaging the inner ring on plane surfaces perpendicular to the axis of the rings, and said inner ring being confined between said outer ring and said third ring so that it cannot engage the cylinder wall.

2. A piston ring construction, comprising a split outer ring for engaging the cylinder wall, and a split inner ring tending to expand, said outer and inner rings engaging on frusto-conical surfaces the angle of which to the axis of the rings is greater than the angle of repose of the material of the rings, being free of any interconnection which prevents them from moving axially on each other on such frusto-conical surfaces, and having respectively toward the smaller and larger ends of said frusto-conical surfaces plane end surfaces perpendicular to the axis of the rings, and a third split ring against which the plane end surface of said inner ring at the large end of said frusto-conical surface bears, said third ring engaging the inner ring on plane surfaces perpendicular to the axis of the rings, and said outer ring having the larger end of its frusto-conical surface of less diameter than is its outer surface so that such outer surface and such frusto-conical surface do not intersect and being sufficiently close to said third ring so that the larger end of the inner ring is prevented from projecting through the space between them into engagement with the cylinder wall.

3. A piston ring construction, comprising three split rings, one of which tends to expand by its own inherent resiliency and acts as a wedge between the other two tending to force them apart against the side walls of the piston groove, said first split ring being held from engaging the cylinder wall by the other two rings and engaging one of the other rings on frusto-conical surfaces and the other on substantially plane surfaces perpendicular to the axis of the rings.

4. A piston ring construction, comprising three split rings, one of which tends to expand and acts as a wedge between the other two tending to force them apart against the side walls of the piston groove, said first split ring being held from engaging the cylinder wall by the other two rings and engaging one of the other rings on frusto-conical surfaces and the other on substantially plane surfaces perpendicular to the axis of the rings.

In witness whereof, I have hereunto set my hand at Indianapolis, Indiana, this tenth day of March, A. D. one thousand nine hundred and sixteen.

OSCAR M. BOSART.